United States Patent [19]

Holmberg et al.

[11] 4,357,454

[45] Nov. 2, 1982

[54] BINDER

[75] Inventors: Krister Holmberg, Mölndal; Jan-Allan Y. Johansson; Gerd E. Wallin, both of Gothenburg, all of Sweden

[73] Assignee: Eka AB, Surte, Sweden

[21] Appl. No.: 294,719

[22] Filed: Aug. 20, 1981

[30] Foreign Application Priority Data

Sep. 2, 1980 [SE] Sweden ............................ 8006100

[51] Int. Cl.³ .......................................... C08L 97/00
[52] U.S. Cl. ............................... 527/403; 106/123 R; 106/123 LC; 260/124 R; 527/400; 524/72; 524/74
[58] Field of Search ...................... 527/400, 403; 106/123 R, 123 LC; 260/124 R; 524/72, 74

[56] References Cited

U.S. PATENT DOCUMENTS

| | | | |
|---|---|---|---|
| 2,282,518 | 5/1942 | Hochwalt et al. | 527/400 |
| 2,878,197 | 3/1959 | Baxter et al. | 260/17.5 |
| 3,931,072 | 1/1976 | Coyle | 527/403 |
| 4,130,515 | 12/1978 | Bornstein | 527/400 |

FOREIGN PATENT DOCUMENTS 155152  7/1956  Sweden.

Primary Examiner—Earl A. Nielsen
Attorney, Agent, or Firm—Luedeka, Fitch & Neely

[57] ABSTRACT

A lignin product-containing binder and a process for its production are described.

The lignin product consists of chlorolignin which has been treated with strong alkali (NaOH) for preferably 0.5–3 h. at 50°–100° C. and a pH of 10–13.5. The alkali-treated chlorolignin product can be used on its own as a binder component or, preferably, together with phenol-formaldehyde. The weight ratio phenol/lignin product is suitably from 4:1 to 1:4.

7 Claims, No Drawings

BINDER

The present invention relates in general to the employment of lignin-based products, more precisely chlorolignin derivatives, as binders. The invention embraces a binder which contains such a chlorolignin derivative and a method for producing the binder.

Binders based on degraded and modified lignins from the sulfite waste liquor of the cellulose industry have long been tested for, for example, chipboard gluing [Adhäsion (1979), p. 334]. These degraded and modified lignins have proved to possess a certain bonding capacity which is not, however, sufficient for most applications. As a result, combinations have, to a great extent, been effected of these lignin-based polymers with established synthetic resins, primarily phenol and amino resins [Adhäsion (1979), p. 368].

Many attempts have also been made to react together phenol, sulfite lignin and formaldehyde, that is to say to chemically incorporate the lignin in the phenol resin. In many cases this has resulted in usable binders in which the primary function of the sulfite lignin has been to reduce the raw material price of the product (please see East-German Patent Specification No. 13 43 63).

Attempts have been made in different manners to produce usable binders also from so-called sulfate lignin (please see DE Offenlegungsschrift 27 58 572). The problems seem to have been greater than those inherent in sulfite lignin, and sulfate lignin-based binders are used today to a very limited extent.

As was mentioned above, the invention relates to the use, as binder, of products obtained from chlorolignin. Chlorolignin is obtained on the bleaching of cellulose and is included, as a pollutant component in the discharge from the bleaching plant. Normally, the cellulose bleaching in a bleaching plant consists of the steps chlorine, alkali I, hypochlorite, chlorine dioxide, alkali II and chlorine dioxide, the steps normally being designated C E H D E D. The spent liquor from the first alkali stage ($E_1$) contains about 80% of the lignin in the unbleached pulp. Moreover, the spent liquor contains other both organic and inorganic substances. Among the inorganic substances, mention might primarily be made of sodium chloride and other chlorides; and among the organic substances are to be found primarily lignin degradation products as well as carbohydrates from the hemicellulose of the pulp. These other substances in the effluent have a mean molecular weight of less than 1000 and they can be separated from the high molecular products of the effluent, such as chlorolignin, by filtration such as ultrafiltration. Ultrafiltration and its use within the cellulose industry are described in Revue A.T.I.P., vol. 28, No. 1, 1974.

By utilizing ultrafiltration, int. al. the color and content of high-molecular weight material in the effluent can thus be markedly reduced, which is vital since the share of the bleaching plant of the total waste discharged from a sulfate factory today constitutes more than 50% of both color and lignin and of BOD. However, in the ultrafiltration great amounts of the chlorolignin are obtained as a residual product in the concentrate, and it will be appreciated that the total economy of the ultrafiltration could be considerably improved if this residual product could be utilized commercially.

In this context, it is previously known from Swedish patent application No. 7813359-2 to make use of natural chlorolignin of a molecular weight of higher than 1000 as glue for joining together cellulosic material, either alone or in mixtures with synthetic glue components such as urea resins or other nitrogen-containing resins, phenolformaldehyde resins or the like. In combination primarily with phenol resins a certain bonding effect will here be attained. However, in most cases the strength of the glue joint will be considerably better using pure phenol resin than using the lignin-modified binder. This is also valid if the chlorolignin has first been precondensed with formaldehyde.

Against the background of the above situation, it has now surprisingly proved that the properties of such a chlorolignin-based binder will drastically be improved if it is first treated with a strong alkali, such as NaOH or KOH, NaOH being preferred. Thus, there will be obtained according to the present invention an excellent lignin-containing binder if the lignin-containing binder component consists of chlorolignin which has been treated with a strong alkali, the treatment conditions being variable within broad limits. The treatment temperature can lie between about 50° C. and about 100° C., the range of from about 80° to about 100° C. being preferred, while the pH of the reaction solution is from about 10 to about 13.5, preferably from about 11 to about 13. The time for the alkali treatment is adapted to the temperature and pH and is suitably about 0.5-3 h. Lower temperature and pH require longer treatment time, and vice versa.

If a salt-free binder is desired, the binder according to the invention can be subjected to ultrafiltration after the alkali treatment.

The binder according to the invention is primarily intended for use together with cellulosic material such as wood, fibers, chips, shavings, wood waste and the like, but it can also be used together with other materials such as mineral or glass wool.

The other characteristics of the present invention will be apparent from the following description and the appended claims.

It is known from Swedish printed application No. 7811089-7 to alkali-treat chlorolignins for completely other purposes (namely waste management) to convert such chlorolignins into harmless, combustible waste products which, on combustion, do not cause as large corrosion and environmental problems as the original chlorolignins. No other use of the products obtained by this alkali treatment than combustible waste products has been suggested or even intimated in the art and it may, therefore, be considered as very surprising that the alkali treatment can be utilized within the art of binder technology, to realize a very manifest, unexpected improvement of the bonding capacity of chlorolignin-based glue products.

The product according to the invention obtained after the alkali treatment is usable on its own as a binder, but considerably better results are obtained if the product is combined with a phenol or amine resin, that is to say if the product, together with a phenol or amine such as phenol or melamine, respectively, is condensed with an aldehyde, such as formaldehyde or paraformaldehyde. Condensation together with phenol and formaldehyde is to be preferred. The weight ratio between phenol and lignin product is not critical but can be varied within arbitrary limits. However, a suitable ratio lies between 4:1 and 1:4, a preferred range being from 2:1 to 1:1. The proportion of aldehyde is selected in a conventional manner in correspondence with the included amounts of phenol and lignin product, the preferred mol ratio between aldehyde and phenol/lignin product being from about 1:1 to about 4:1. The same manufacturing methodology as for conventional phenol resins is also otherwise applied in the preparation of the binder according to the invention, that is to say a pH of from 8 to 12, a temperature of about 60° to about 100° C. and a final viscosity at 20° C. and 40% total solids of 100–5000 mPa.s.

The lignin-phenol based binder according to the invention has substantially the same properties as pure, commercial phenol resins as regards glue for, for example, plywood and chipboard. Moreover, the admixture of the lignin-based material results in a considerable lowering of the raw material costs of the binder.

A particularly preferred embodiment of the invention is to carry out the alkali treatment of the chlorolignin and condensation of the alkali-treated lignin product, phenol and formaldehyde in one step. Here, there will be obtained substantially the same product as in a two-step process, that is to say in which the chlorolignin is first alkali-treated in a first step and thereafter, together with phenol, condensed with formaldehyde.

The reason for the manifestly improved binder effect of the chlorolignin after alkali treatment is not fully known. However, without limiting the present invention to any particular theory, one explanation might be that chlorine-substituted quinones which are abundantly represented in the chlorolignin are hydroxylated and converted into hydroxy quinones in the alkali treatment. As a result, the product becomes more suitable as a binder component, partly because the number of hydrogen-bonding groups increases (which improves adhesion), and partly because of reactivity both in Diels-Alder reactions and in reactions with formaldehyde and phenol increases. However, the structure of the degraded and oxidized lignin is so un-defined and scantily known that all theories are very insecurely underpinned.

Some illustrative but not restrictive Examples of the invention are given below.

EXAMPLE 1

To a 50% by weight solution of chlorolignin, which had been separated by means of ultrafiltration from the extraction stage of a sulfate-cellulose bleaching plant (100 parts by weight), phenol (50 parts by weight) and paraformaldehyde (46 parts by weight) was added NaOH to pH 12. Reaction was allowed to continue at 90° C. until the viscosity of the solution at 20° C. and 40% total solids was about 500 mPa.s.

Chipboards were manufactured using the above binder. The content of binder in the boards was 10%. The conditions at the pressing were 4 min. and 180° C. As a comparison, chipboards were also manufactured, partly using a commercial phenol glue and partly using a commercial melamine-urea glue under the same conditions as above, but with the difference that these boards did not contain any lignin binder according to the invention.

The chipboards were evaluated with respect to flexural strength and swelling. The results of this evaluation are apparent from Table 1 below.

TABLE 1

| Glue | Flexural strength (MPa) | Swelling (%) |
|---|---|---|
| Lignin-phenol | 2.4 | 4 |
| Phenol | 2.3 | 4 |

TABLE 1-continued

| Glue | Flexural strength (MPa) | Swelling (%) |
|---|---|---|
| Melamine-urea | 2.1 | 2 |

EXAMPLE 2

To the same solution of chlorolignin are used in Example 1 (100 parts by weight) was added NaOH to pH 12. The solution was boiled for 2 h. After cooling, 34 parts by weight of phenol and 27 parts by weight of paraformaldehyde were added. The pH was readjusted to 12, whereafter the reaction was allowed to continue at 90° C. until the viscosity of the solution at 20° C. and 40% total solids was about 500 mPa.s.

The binder was tested and evaluated as chipboard glue in analogy with Example 1. The results are apparent from Table 2 below.

TABLE 2

| Glue | Flexural strength (MPa) | Swelling (%) |
|---|---|---|
| Lignin-phenol | 2.1 | 5 |
| Phenol | 2.3 | 4 |
| Melamine-urea | 2.1 | 2 |

EXAMPLE 3

To a 50% by weight solution of chlorolignin added NaOH to pH 12. The solution was boiled for 2 h. and was then allowed to cool to room temperature.

Chipboards were manufactured with the above binder. The content of binder in the boards was 10% and the pressing conditions were 4 min. and 180° C. The flexural strength of the finished chipboards was measured at 1.5 MPa. This shows that the binder according to the invention functions well as a binder when used alone, that is to say without an addition of phenol resin or the like. However, the bonding force is lower.

EXAMPLE 4 (Comparison)

Chipboards were manufactured using a solution of untreated chlorolignin as binder. The content of binder in the boards was 10% and the pressing conditions were 4 min. and 180° C., that is to say the same conditions as in Example 3. The flexural strength of the finished boards was measured at but 0.4 MPa, which shows the poor gluing capacity of the untreated chlorolignin, as compared with the gluing capacity of the alkali-treated or hydroxylated chlorolignin according to the invention (Example 3).

EXAMPLE 5 (Comparison)

To a 50% by weight solution of chlorolignin (100 parts by weight) were added phenol (50 parts by weight) and formaldehyde (46 parts by weight). The pH was adjusted to about 9 with NaOH. The reaction was allowed to continue at 90° C. until the viscosity of the solution was about 500 mPa.s at 20° C. and 40% total solids.

Chipboards were manufactured using the above binder. The content of binder in the boards was 10% and the pressing conditions were 4 min. and 180° C. The flexural strength was 1.45 MPa.

A comparison with Example 1, in which the conditions were the same with the exception of the alkali treatment, demonstrates that the invention quite surprisingly results in a superior binder.

EXAMPLE 6 (Comparison)

Phenol (50 parts by weight) and formaldehyde (46 parts by weight) were dissolved in water (50 parts by weight). The pH was adjusted to about 9 with NaOH. The reaction was allowed to continue at 90° C. until the viscosity of the solution was about 500 mPa.s at 20° C. and 40% total solids.

Chipboards were manufactured using the above binder. The content of binder in the boards was 6.6% and the pressing conditions were 4 min. and 180° C. The flexural strength was 1.3 MPa.

What we claim and desire to secure by Letters Patent is:

1. A binder of the lignin type, containing, as binder component, alkali-treated chlorolignin, alone or in combination with phenol resin or amine resin.

2. The binder according to claim 1, characterized in that it contains phenol formaldehyde resin, the weight ratio between phenol and alkali-treated chlorolignin being from 1:4 to 4:1.

3. A process for preparing binder of the lignin type, wherein chlorolignin is alkali-treated at pH 10–13.5 at a temperature of from about 50° C. to about 100° C. for a time of from 0.5 to 3 h. and wherein optionally the chlorolignin, in conjunction with or after the alkali treatment, is combined with phenol resin or amine resin.

4. The process according to claim 3, wherein the chlorolignin, together with phenol, is condensed with formaldehyde at pH 10–13.5 after the alkali treatment.

5. The process according to claim 3, wherein the chlorolignin, together with phenol, is condensed with formaldehyde in conjunction with the alkali treatment.

6. The process according to claim 4 or 5, wherein the condensation is carried out to a viscosity of about 100–5000 mPa.s at a temperature of 20° C. and a total solids of 40%.

7. The process according to claim 3, wherein the alkali treatment takes place with NaOH.

* * * * *